US008291101B1

(12) United States Patent
Yan et al.

(10) Patent No.: US 8,291,101 B1
(45) Date of Patent: Oct. 16, 2012

(54) SYNCHRONIZATION OF MUTUALLY SHARED DATA STORED ON NETWORK DEVICES

(75) Inventors: Xudong Yan, Palo Alto, CA (US); Panagiotis Kougiouris, Cupertino, CA (US); Theron Tock, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1328 days.

(21) Appl. No.: 11/297,595

(22) Filed: Dec. 8, 2005

(51) Int. Cl.
*G06F 15/16* (2006.01)
(52) U.S. Cl. ........ 709/231; 709/230; 709/232; 709/233; 709/234; 709/235; 709/236
(58) Field of Classification Search .......... 709/201–203, 709/212–216, 217–219, 248, 230–236; 707/10, 707/100, 104, 200, 203–206, 610–615, 685
See application file for complete search history.

(56) References Cited

U.S. PATENT DOCUMENTS

| 5,832,514 | A  | * | 11/1998 | Norin et al. ............................. | 1/1 |
| 5,884,325 | A  | * | 3/1999 | Bauer et al. ............................. | 1/1 |
| 6,311,186 | B1 | * | 10/2001 | MeLampy et al. ....................... | 1/1 |
| 6,401,104 | B1 | * | 6/2002 | LaRue et al. ............................. | 1/1 |
| 6,721,871 | B2 | * | 4/2004 | Piispanen et al. ................. | 712/1 |
| 6,721,941 | B1 | * | 4/2004 | Morshed et al. .............. | 717/127 |
| 2003/0212686 | A1 | * | 11/2003 | Chu-Carroll et al. ......... | 707/100 |
| 2005/0044108 | A1 | * | 2/2005 | Shah et al. ................. | 707/104.1 |
| 2005/0044187 | A1 | * | 2/2005 | Jhaveri et al. ................. | 709/219 |

OTHER PUBLICATIONS

Satyanarayanan, "Distributed File Systems", chapter 14 pdf file, Sep. 26, 2001, http://wwwhome.ewi.utwente.nl/~sape/gos/chap14.pdf.*
RFC 793-Transmission Control Protocol (Sep. 1981), from http://tools.ietf.org/html/rfc793#section-3.1.*
Leon-Garcia, "Communication Networks: Fundamental Concepts and Key Architectures", second edition, 2004, p. 438-442.*
Satyanarayanan, "Distributed File Systems", chapter 14, Sep. 26, 2001.*

* cited by examiner

*Primary Examiner* — David Lazaro
*Assistant Examiner* — Edward Kim
(74) *Attorney, Agent, or Firm* — Shumaker & Sieffert, P.A.

(57) ABSTRACT

Techniques are described for resynchronizing mutually shared data stored on network devices of a computer network. Upon receiving change instruction and globally unique identifier (GUID) messages, each of the network devices records the change instructions and GUIDs in a journal of the network device. When communication is lost for a period of time between a first network device and a second network device, the mutually shared data of the first network device may need to be resynchronized with the mutually shared data of the second network device. The techniques described herein allow resynchronization of the mutually shared data of the first network device based on a common GUID recorded in the journals of both first and second network devices, the journal of the first network device, and the journal of the second network device.

42 Claims, 8 Drawing Sheets

SYNCHRONIZATION OF MUTUALLY SHARED DATA STORED ON NETWORK DEVICES

TECHNICAL FIELD

The invention relates to network devices and, more specifically, to synchronizing data stored on network devices.

BACKGROUND

A computer network is a collection of interconnected network devices that exchange data and share resources. A computer network may comprise a private network, such as a corporate network, or a public network, such as the Internet. Computer networks may include local area networks (LANs) or wide area networks (WANs). As an example, a corporate network may include instant virtual extranet (IVE) devices that allow authorized remote users access to the corporate network. Employees or business partners may connect to the IVE devices over a public network via a virtual private network (VPN) or another type of connection. The IVE devices then communicate with servers or applications within the corporate network. In this way, the IVE devices may serve as access proxies.

Network devices, such as IVE devices, may store copies of the same data. If one of the network devices changes the content of the mutually shared data, the other network devices must update their copies of the mutually shared data to reflect the changed content. The process of updating the copies of the mutually shared data is known as synchronization. For example, a set of IVE devices within a corporate network may each store a mutually shared list of authorized users. In this case, when the corporate network adds a new user to the list of authorized users on a first IVE device, the new user is also added to the list of authorized uses on each of the other IVE devices via synchronization messages from the first IVE device.

Occasionally a network connection between two or more of the network devices may become unavailable due to breakage or maintenance and cause an interruption in the synchronization messages from the other network devices. Once communication is restored, the process of updating the mutually shared data on the network device is known as resynchronization. Traditionally, network devices consume considerable resources when performing resynchronization for large amounts of the mutually shard data. In particular, a first network device may have to copy an entire database of the mutually shared data from a second network device in order to resynchronize the first network device. Despite the increased bandwidth available to many network devices, it still takes a considerable amount of time to transfer large volumes of the mutually shared data. In addition, the network device may be unable to make changes to the mutually shared data before the network device finishes copying the data. In this way, synchronization messages for the mutually shared data may be lost to the network device.

Alternatively, network devices may use a two-phase commit approach that prohibits the network devices from making changes to the mutually shared data unless all the network devices possessing the mutually shared data can make the changes. However, the two-phase commit approach may prevent needed changes in some of the network devices if a network connection to one of the network devices is unavailable.

SUMMARY

The invention is directed to techniques for resynchronizing mutually shared data stored on network devices of a computer network. At least two network devices may be coupled to each other via the computer network. The network devices exchange change instruction and globally unique identifier messages using an "agreed-ordering" protocol. The agreed-ordering protocol ensures that messages processed on any one device follows a logical order. For instance, if a first device processes a message M1 and then processes a message M2, then all devices process M1 and then process M2. In addition, the agreed-ordering protocol ensures that all devices process messages in the same order. For example, if a first device processes a message M3 followed by a message M4, then a second device processes M3 before M4. Upon processing a change instruction message, each of the network devices updates a current state of the mutually shared data stored on the network device to reflect the change. In addition, each of the network devices records the change instruction in a journal of the network device. The network devices may also send unique identifiers. A unique identifier is any identifier that is unique within a system, for instance a globally unique identifier (GUID). The network devices record the GUIDs in the respective journals of the network devices. A GUID represents a state of the mutually shared data stored on each of the network devices immediately before the network device processes the GUID.

When communication is lost for a period of time between a first network device and a second network device, the mutually shared data of the first network device may need to be resynchronized with the mutually shared data of the second network device. The techniques described herein allow the first device to receive change instructions and GUIDs recorded in a journal of the second network device following a common GUID recorded in the journals of both the first device and the second device. In this way, the GUIDs enable the network devices to perform resynchronization by copying a relatively small amount of data between the network devices.

In one embodiment, a method of resynchronizing a network device comprises receiving a unique identifier from a second network device coupled to the network device via a network, wherein the network device and the second network device store mutually shared data. The method also includes recording the unique identifier in a journal of the network device that records change instructions and unique identifiers in the order in which the change instructions and unique identifiers are sent. In addition, the method comprises resynchronizing the mutually shared data of the first network device by sending a resynchronization request to the second network device that includes a sequence of unique identifiers recorded in the journal of the first network device.

In another embodiment, a network device comprises a database to store data mutually shared between the network device and a second network device. In addition, the network device comprises a journal to record change instructions and one or more unique identifiers in an order in which the second network device sent the change instructions and the unique identifiers to the network device. The network device also includes a synchronization service module to resynchronize the mutually shared data of the first network device by sending a resynchronization request to the second network device that includes a sequence of the unique identifiers recorded in the journal.

In another embodiment, a computer-readable medium for resynchronizing a network device comprises instructions that cause a programmable processor to receive a unique identifier from a second network device coupled to the network device via a network, wherein the device and the second network devices store data that is mutually shared. The instructions also cause the processor to record the unique identifier in a journal of the network device that records change instructions in the order in which the change instructions are received. In addition, the instructions cause the processor to resynchronize the mutually shared data of the network device by sending a resynchronization request to the second network device that includes a sequence of unique identifiers recorded in the first network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
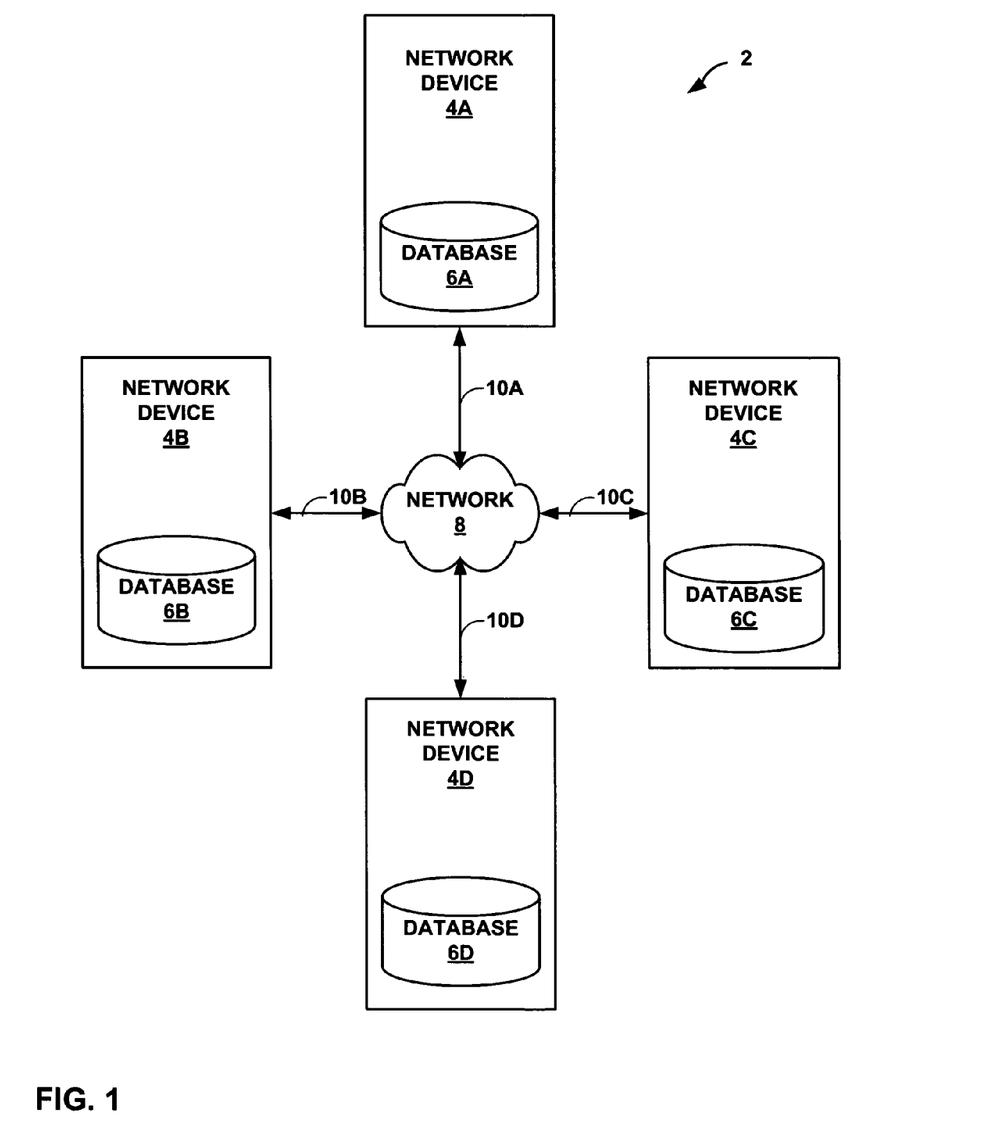
FIG. 1 is a block diagram illustrating an exemplary system in which network devices maintain copies of mutually shared data in databases.

FIG. 1 is a block diagram illustrating an exemplary system 2 in which network devices 4A-4D ("network devices 4") maintain copies of mutually shared data in databases 6A-6D ("databases 6"). Network devices 4 are communicatively coupled to each other through a network 8. In particular, each of network devices 4 communicates with network 8 via connections 10A-10D, respectively. Network 8 may be a private network, such as a corporate network, or a public network, such as the Internet. In some cases, network 8 may comprise a local area network (LAN) or a wide area network (WAN). Connections 10A-10D ("connections 10") may represent telephone lines, network cables, wireless connections, or another type of connection.

As an example, network 8 may comprise a corporate network in which network device 4 comprise instant virtual extranet (IVE) devices. IVE devices allow authorized remote users access to the corporate network. Employees or business partners may connect to the IVE devices over a public network via a virtual private network (VPN) or another type of connection. The IVE devices then communicate with servers or applications within the corporate network. In this way, the IVE devices may serve as access proxies.

Network devices 4 store mutually shared data in databases 6. For example, the mutually shared data in databases 6 may include parameters, policies, user profiles, security information, or run-time states. Network devices 4 may change the mutually shared data in databases 6 at any time. For instance, the run-time state of network device 4A may change when a user sends a command to network device 4A.

When changes occur to the mutually shared data, network devices 4 may send synchronization messages to the other network devices 4 through connections 10 and network 8. These synchronization messages may include change instructions and unique identifiers. Change instruction messages comprise instructions to network devices 4 to update the mutually shared data stored in databases 6 in a particular way. For example, suppose an original state of the mutually shared data is x=4, y=5, and z=6. A first change instruction message may instruct network devices 4 to change x to 7. A second change instruction message may instruct network devices 4 to change y to 8. After receiving and processing these two change instruction messages, the state of the mutually shared data is x=7, y=8, and z=6.

In general, a unique identifier acts like a guidepost or bookmark. A unique identifier may be any identifier that is unique within system 2. For instance, a unique identifier may be a globally unique identifier (GUID). A GUID informs network devices 4 that all devices that processed the GUID have processed the same change instructions messages, and hence have the same states of mutually shared data. For example, again suppose that the original state of the mutually shared data is x=4, y=5, and z=6. A device, e.g., network device 4A, processes a first change instruction message that instructs network device 4A to change x to 7. Next, network device 4A processes a GUID. After processing the GUID, network device 4A processes a second change instruction message instructing network device 4A to change y to 8. After processing the two change instruction messages and the GUID, the state of the mutually shared data maintained by network device 4A is x=7, y=8, and z=6. In addition, network device 4A knows all devices that received the GUID also received the first change instruction. That is, network device 4A knows that each of network devices 4 maintained a state of mutually shared data such that x=7, y=5, and z=6 when the network devices processed the GUID.

Because GUIDs act as bookmarks, network devices 4 may use GUIDs to resynchronize the mutually shared data between the network devices without copying an entire database of the mutually shared data. When a first device, such as network device 4A, realizes that one or more change instruction or GUID messages were not processed, network device 4A sends a resynchronization request including a sequence of GUIDs processed by network device 4A to a second device that also maintains the mutually shared data, e.g., network device 4B. Upon receiving the sequence of GUIDs, network device 4B identifies the latest GUID in the sequence that has also been processed by network device 4B as a common GUID. Network device 4B then sends a resynchronization reply to network device 4A that includes the common GUID and any subsequent change instruction and GUID messages. Network device 4A then uses the common GUID and the subsequent change instruction and GUID messages to resynchronize the mutually shared data stored in database 6A of network device 4A.

In order to assure that the GUIDs actually represent shared states of mutually shared data, network devices 4 exchange change instruction and GUID messages using an "agreed-ordering" protocol. As described above, the agreed-ordering protocol ensures that messages processed on any one device follows a logical order. For instance, if network device 4A processes a message M1 and then processes a message M2, then all network devices 4 process M1 and then process M2. In addition, the agreed-ordering protocol ensures that network devices 4 process messages in the same order. For example, if network device 4A processes a message M3 before a message M4, then a network device 4B processes M3 before M4. The agreed-ordering property of the communication protocol ensures that network device 4B, or any other device in network 8, processes the same set of change instructions in the same order between two unique GUID messages. Right after processing a common GUID, two network devices have an identical shared mutual data store state.

If network device 4B cannot identify a common GUID in the sequence of GUIDs sent by network device 4A, network devices 4A and 4B may use a textual comparison and resynchronization routine to resynchronize the mutually shared data maintained by network device 4A. The textual comparison and resynchronization routine may comprise comparing canonical representations of the mutually shared data stored in database 6A of network device 4A and database 6B of network device 4B. In one embodiment, network devices 4 may use the "rsync" algorithm invented by Andrew Tridgell of Canberra, Australia to efficiently resynchronize databases 6A and 6B. Other embodiments may use an alternate resynchronization algorithm such as the "zsync" algorithm invented by Colin Philips of the United Kingdom.

In this way, network devices 4 may reduce or minimize the amount of information transmitted across network 8 when resynchronizing the mutually shared data maintained by each of network devices 4. In this way, network devices 4 may no longer need to transmit significant amounts of information, such as an entire database of the mutually shared data, across network 8. The techniques described herein enable network devices 4 to only transmit the information needed to update a network device from a latest common state of the mutually shared data to a current state of the mutually shared data.

Minimizing the amount of data exchanged when performing resynchronization may have several advantages. For example, the bandwidth of connections 10 or network 8 may be low or congestion on connections 10 or network 8 may be high. In either case, sending large volumes of information may cause unreasonable delays. These delays may cause increased difficulties if network devices 4 continue to send change instruction and GUID messages during a resynchronization process. For example, network devices 4 may be unable to update databases 6 while a resynchronization process is in progress. Consequently, the delays may prevent devices 4 from receiving time-sensitive information. Transmitting a reduced amount of data minimizes these delays.

Figure 2:
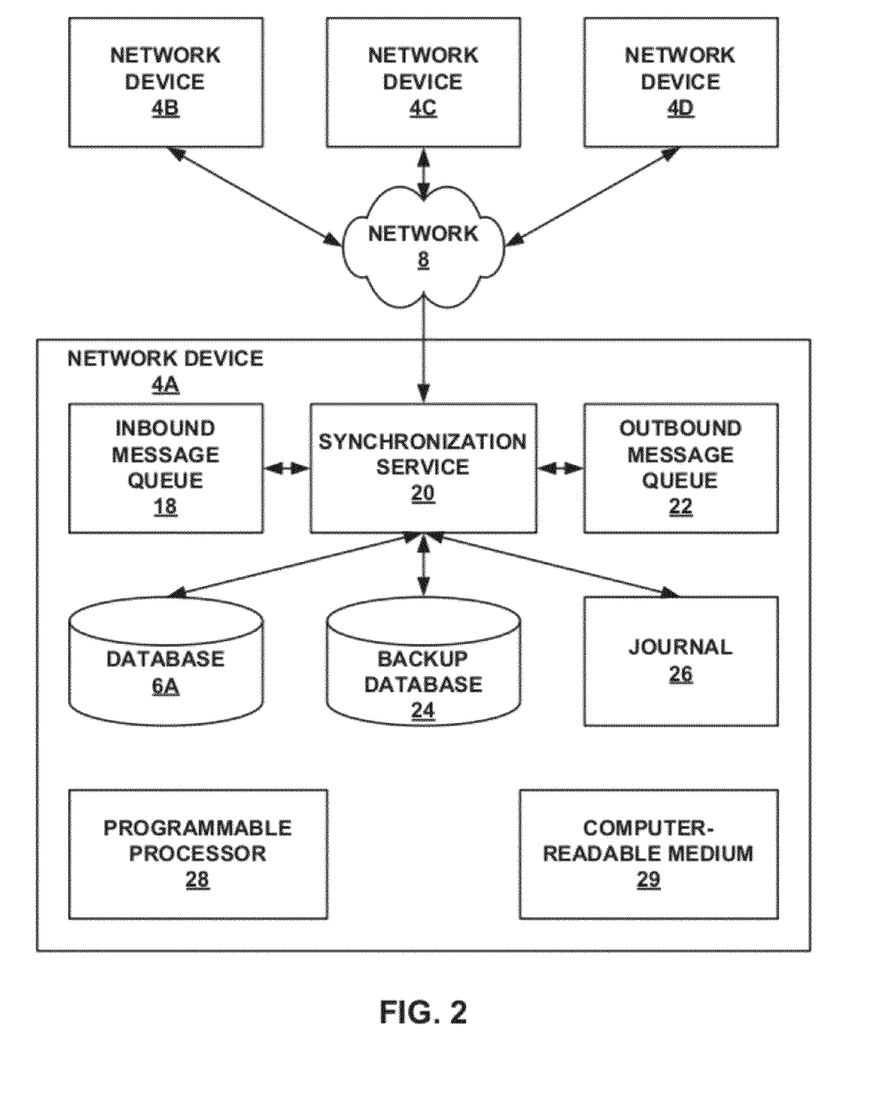
FIG. 2 is a block diagram illustrating a network device from FIG. 1 in greater detail in accordance with an embodiment of the invention.

FIG. 2 is a block diagram illustrating network device 4A from FIG. 1 in greater detail in accordance with an embodiment of the invention. Network device 4A includes database 6A, an inbound message queue 18, a synchronization service module 20, an outbound message queue 22, a backup database 24, a journal 26, a programmable processor 28, and a computer-readable medium 29. As in FIG. 1, network device 4A is connected via network 8 to network devices 4B, 4C, and 4D. Network devices 4B, 4C, and 4D may also employ the implementation described below in reference to device 4A or another compatible implementation. One example of computer-readable medium 29 stores instructions for resynchronizing mutually shared data stored by a network device and a second network device. In some examples, the instructions cause programmable processor 28 to perform various techniques of the present disclosure.

Synchronization service module 20 may be executable by programmable processor 28. Synchronization service module 20 of network device 4A uses an agreed-order protocol to exchange change instruction and GUID messages with network devices 4B, 4C, and 4D. In one embodiment, each of network devices 4 uses a token to ensure that each of network devices 4 process change instruction and GUID messages in the same order. A token is a data structure with a unique identifier that passes between network devices 4 in a fixed order. For example, suppose the token starts at network device 4A. Network device 4A then passes the token to network device 4B, network device 4B passes the token to network device 4C, and network device 4C in turn passes the token to network device 4D. Finally, network device 4D passes the token to network device 4A, completing the circuit.

One exemplary protocol uses sequence numbers to ensure that network devices 4 process messages in the correct order. In particular, each change instruction and GUID message includes a sequence number. In addition, the token contains a "last sent sequence number". The "last sent sequence number" is the sequence number of the last change instruction or GUID message sent to network 8 by any of network devices 4. The token also contains a "last received sequence number" for each of network devices 4. A "last received sequence number" for a network device reflects the latest change instruction or GUID message sequence number that the network device has received.

When a network device 4A receives a change instruction or GUID message, network device 4A inserts the message into inbound message queue 18. Network device 4A does not immediately process the change instruction or GUID. Rather, network device 4A waits until it receives the token.

When synchronization service module 20 receives the token, synchronization service module 20 updates the "last received sequence number" for network device 4A in the token. In particular, synchronization service module 20 sets the "last received sequence number" to the value of the largest change instruction or GUID message sequence number in inbound message queue 18. In addition, synchronization service module 20 processes each message in inbound message queue 18 in order of increasing sequence numbers up to the lowest "last received sequence number" for any of devices 4. After synchronization service module 20 processes a message, synchronization service module 20 deletes the message from inbound message queue 22.

If a message exists in outbound message queue 22, synchronization service module 20 may send the message when synchronization service module 20 receives the token. To send a change instruction or a GUID message, synchronization service module 20 increases the "last sent sequence number" of the token by one. Synchronization service module 20 then includes the increased "last sent sequence number" in new change instruction or GUID message. Next, synchronization service module 20 sends the new message to devices 4. In addition, synchronization service module 20 copies the new message into inbound message queue 18 to await processing.

To process a process a change instruction, synchronization service module 20 updates database 6A according to the change instruction. Synchronization service module 20 then creates an entry for the change instruction in journal 26. To process a GUID message, synchronization service module 20 creates an entry for the GUID in journal 26.

As synchronization service module 20 creates entries in journal 26, the size of journal 26 may eventually surpass a predetermined threshold. When synchronization service module 20 determines that the size of journal 26 surpasses the predetermined threshold, synchronization service module 20 creates a new GUID and enqueues the GUID in outbound message queue 22. Synchronization service module 20 then enters a special receive state. While in the special receive state, synchronization service module 20 may continue to add entries to journal 26 and update database 6A. However, when synchronization service module 20 is in the special receive state and processes a GUID message, synchronization service module 20 launches a journal rollover process. Specifically, synchronization service module 20 copies the mutually shared data of database 6A into backup database 24. Synchronization service module 20 then deletes the contents of journal 26. After deleting journal 26, synchronization service module 20 records the processed GUID as the first entry in journal 26. Synchronization service module 20 may then resume creating entries for change instruction and GUID messages to journal 26. In this way, journal 26 logically represents the difference between backup database 24 and database 6A.

In some cases, synchronization service module 20 may detect a failure in one of connections 10 through a number of methods. For example, synchronization service module 20 may determine that connection 10A has failed if synchronization service module 20 did not receive the token before a timeout expired. In this case, synchronization service module 20 may create special broadcast message that requests that network devices 4 resend the token. Alternatively, synchronization service module 20 may determine the failure of connection 10A when the token has an unexpected identifier.

When synchronization service module 20 determines that connection 10A has been restored, synchronization service module 20 sends a resynchronization request to one of network devices 4B-4D. Specifically, synchronization service module 20 uses journal 26 to generate a sequence of GUIDs arranged in the order that synchronization service module 20 processed the GUIDs. Synchronization service module 20 then packages the sequence of GUIDs into a resynchronization request and sends the resynchronization request to one of network devices 4B-4D.

One of network devices 4B-4D, e.g., network device 4B, then replies to the resynchronization request with a resynchronization reply that includes a chronologically-ordered sequence of GUIDs and change instruction messages that network device 4B processed after the latest common GUID. For example, suppose that network device 4B uses the same internal embodiment as network device 4A. When network device 4B receives the resynchronization request with the sequence of GUIDs from network device 4A, network device 4B takes the latest recorded GUID in the received sequence and attempts to locate a corresponding GUID in the journal of network device 4B. If network device 4B cannot find the latest recorded GUID, network device 4B takes the second to last GUID in the received sequence and attempts to locate a matching GUID in the journal of network device 4B. This process continues until either device 4B finds a common GUID or until network device 4B exhausts the received sequence of GUIDs without finding a common GUID.

When network device 4B finds a common GUID, network device 4B generates one or more resynchronization reply messages that contain the common GUID and all change instruction or GUID messages recorded in the journal of network device 4B following the common GUID. Network device 4B then sends the one or more resynchronization reply messages to synchronization service module 20 within network device 4A. Because network device 4B only sends the change instruction and GUID messages occurring after the latest common GUID, network device 4B does not send significantly more information than network device 4A needs to resynchronize the mutually shared data stored in database 6A. Not sending significant amounts of unneeded information accelerates the resynchronization of the mutually shared data.

Upon receipt of the one or more resynchronization reply messages, synchronization service module 20 updates the content of database 6A to reflect the changes specified in the resynchronization reply messages. Specifically, synchronization service module 20 transfers into database 6A the mutually shared data stored in backup database 24. Synchronization service module 20 then searches journal 26 for the common GUID sent with the resynchronization reply messages. Synchronization service 20 then deletes any change instruction and GUID messages recorded in journal 26 following the common GUID and records the change instruction and GUID messages included in the one or more resynchronization reply messages from network device 4B in journal 26 following the common GUID. Synchronization service module 20 then applies the change instruction messages recorded in journal 26 to database 6A. At this point, database 6A of network device 4A is resynchronized with databases 6B-6D of network device 4B-4D.

In the case where network device 4B cannot find a common GUID in the sequence of GUIDs sent by synchronization service module 20 of network device 4A, network device 4B may perform an alternate resynchronization routine. As an example, network device 4B sends an instruction to synchronization service module 20 to begin a textual comparison and resynchronization algorithm. Network device 4A and network device 4B then create serialized versions of databases 6A and 6B, respectively. A serialized version of a database is a representation of the content of a database in string form. Next, synchronization service module 20 computes a series of checksums from the serialized version of database 6A and transfers the checksums to network device 4B. Network device 4B then compares the checksums from network device 4A with checksums computed from the serialized version of database 6B to identify differences between the serialized versions of databases 6A and 6B. After identifying the differences, network device 4B sends instructions to network device 4A that inform synchronization service module 20 to update database 6A.

Figure 3:
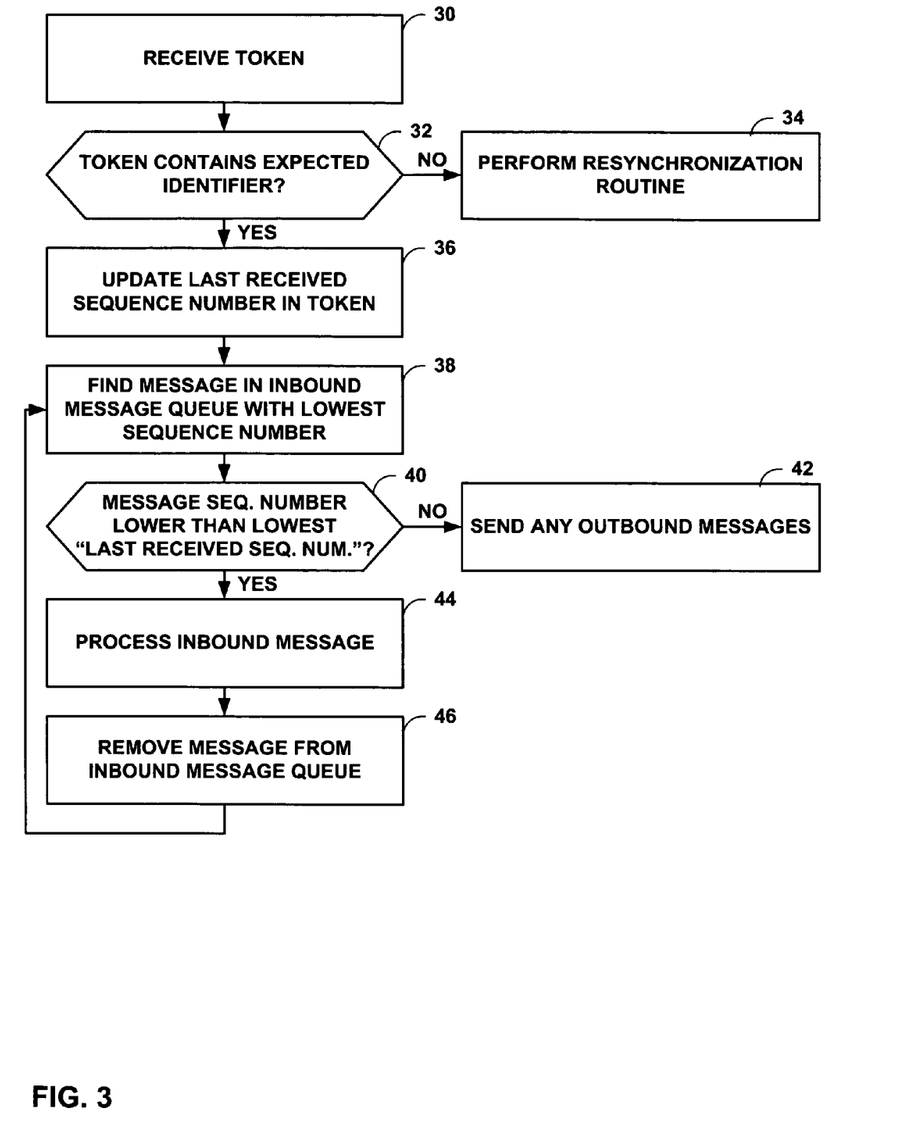
FIG. 3 is a flowchart illustrating an exemplary operation of a network device when the network device receives a token in accordance with an embodiment of the invention.

FIG. 3 is a flowchart illustrating an exemplary operation of a network device when the network device receives a token in accordance with an embodiment of the invention. The operation is described herein in reference to network device 4A illustrated in FIG. 2. Initially, synchronization service module 20 receives a token from network 8 across connection 10A (30). Upon receiving the token, synchronization service module 20 determines whether the token has an identifier that synchronization service module 20 expects (NO of 32). If the token does not possess the expected identifier, synchronization service module 20 concludes that connection 10A has recently been restored from a communication failure. For this reason, synchronization service module 20 performs a resynchronization routine (34).

If the token contains the expected identifier (YES of 32), synchronization service module 20 updates the token with the "last received sequence number" received by the synchronization service module (36). In this situation, the "last received sequence number" is the highest sequence number included in a message in inbound message queue 18. Synchronization service module 20 then finds the message in inbound message queue 18 with the lowest sequence number (38). Synchronization service module 20 then determines whether this lowest sequence number is lower than the lowest "last received sequence number" in the token (40). If the lowest sequence number in inbound message queue 18 is not lower than the lowest "last received sequence number" (NO of 40), synchronization service module 20 sends any outbound messages (42), as described below in reference to FIG. 4. On the other hand, if the lowest sequence number in inbound message queue 18 is lower than the lowest "last received sequence number" (YES of 40), synchronization service module 20 processes the message from inbound message queue 18 with the lowest sequence number (44), as described below in reference FIG. 5. After processing the message, synchronization service module 20 removes the message from inbound message queue 18 (46). Synchronization service module 20 then loops back to find the new lowest sequence number in inbound message queue 18 (38).

Figure 4:
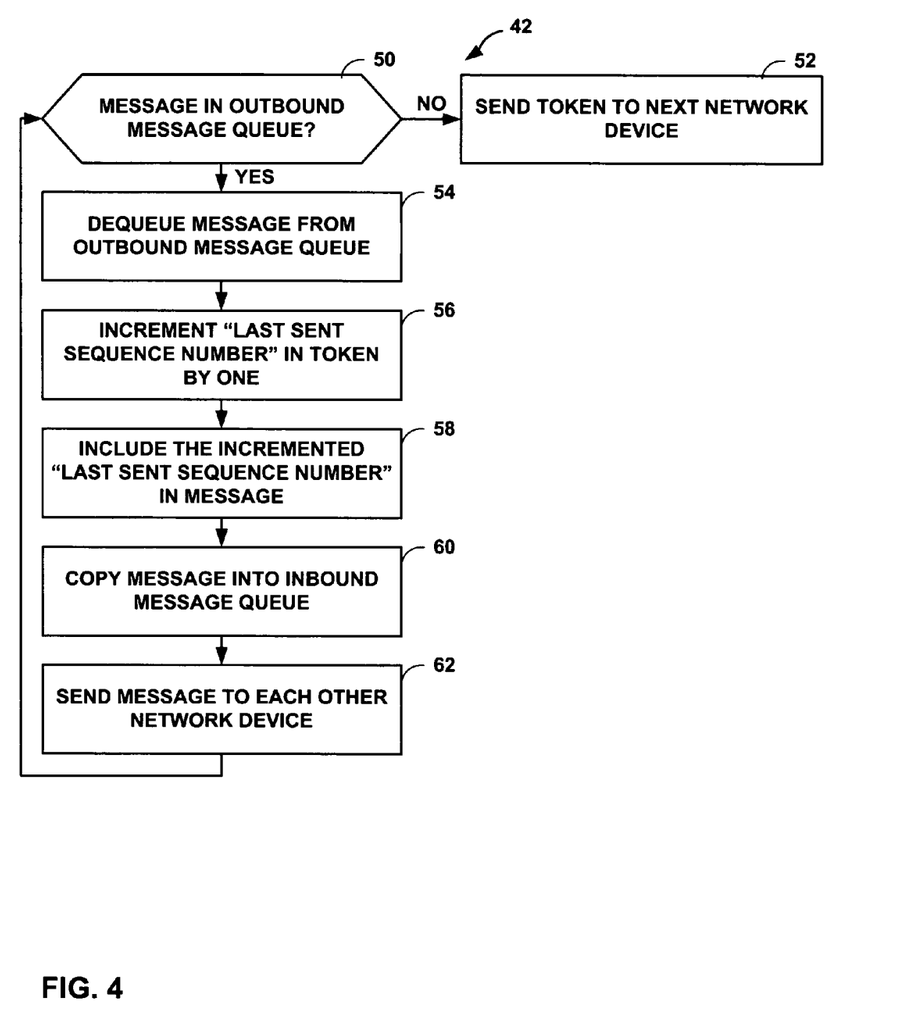
FIG. 4 is a flowchart illustrating an exemplary operation of a network device when the network device sends a message in accordance with an embodiment of the invention.

FIG. 4 is a flowchart illustrating an exemplary operation of a network device when the network device sends a message (i.e., block 42 of FIG. 3) in accordance with an embodiment of this invention. For purposes of illustration, FIG. 4 is an, elaboration of block 42 in FIG. 3. To send a change instruction or GUID message, synchronization service module 20 first determines whether there is a message in outbound message queue 22 (50). If there are no messages in outbound message queue 22 (NO of 50), synchronization service module 20 sends the token to the next network device, e.g., network device 4B (52).

On the other hand, if there is a message in outbound message queue 22 (YES of 50), synchronization service module 20 dequeues the message from outbound message queue 22 (54). Synchronization service module 20 then increments the "last sent sequence number" on the token (56). Next, synchronization service module 20 includes the incremented "last sent sequence number" in the message (58). After including the "last sent sequence number", synchronization service module 20 copies the message into the inbound message queue 18 (60). Synchronization service module 20 next sends the message to devices 4B-4D on network 8 through connection 10A (62).

Figure 5:
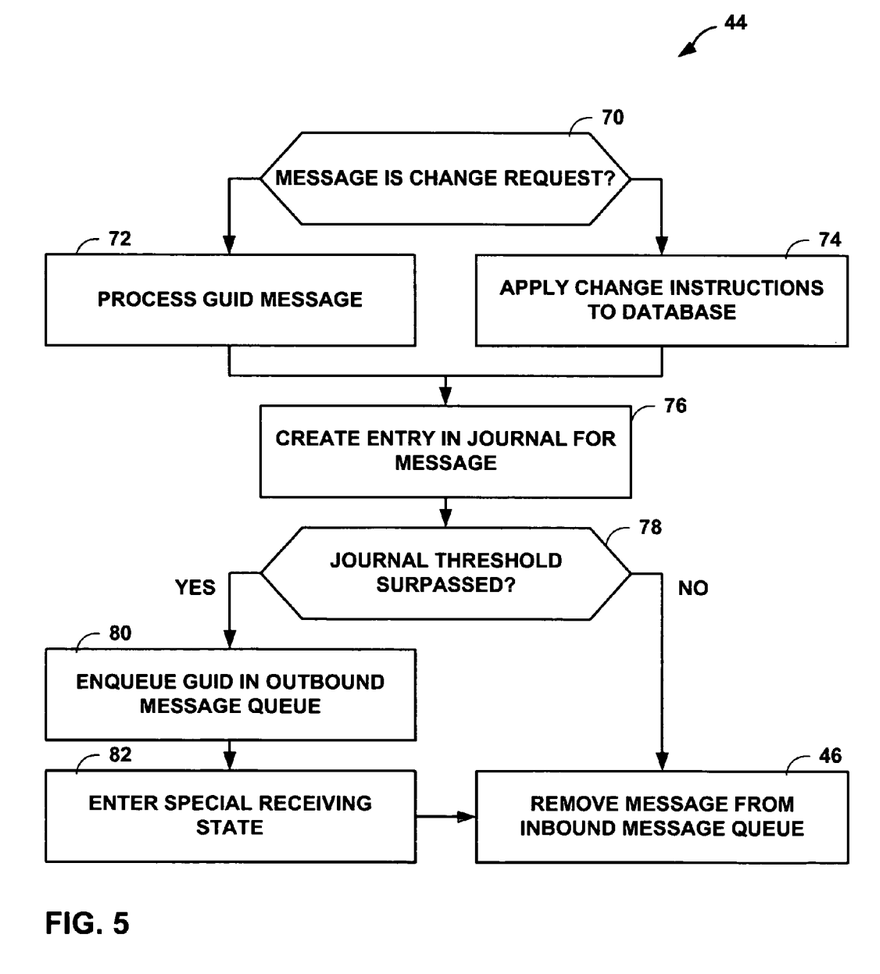
FIG. 5 is a flowchart illustrating an exemplary operation of a network device when processing a change instruction or GUID message in accordance with an embodiment of this invention.

FIG. 5 is a flowchart illustrating an exemplary operation of a network device when processing a change instruction or GUID message in accordance with an embodiment of this invention. To process a change instruction or GUID message, synchronization service module 20 (FIG. 2) first determines whether the message is a change request (70). If the message is a change request (YES of 70), synchronization service module 20 applies the change instruction to database 6A (74). Alternatively, if the message is a GUID (NO of 70), synchronization service module 20 processes the GUID message as described below (72). Synchronization service module 20 then creates an entry in journal 26 for the change instruction or GUID message (76).

Synchronization service module 20 next determines whether to rollover journal 26. In particular, synchronization service module 20 examines journal 26 to determine whether the number of entries recorded in journal 26 surpasses a predetermined threshold (78). If the size of journal 26 surpasses the predetermined threshold (YES of 78), synchronization service module 20 creates and enqueues a new GUID in outbound message queue 22 (80). At this point, synchronization service module 20 enters a special receiving state (82). As explained above, when in the special receiving state, synchronization service module 20 launches a journal rollover routine the next time that synchronization service module 20 processes a GUID message. Regardless of whether or not the size of journal 26 exceeds the predetermined threshold, synchronization service module 20 removes the change instruction or GUID message from inbound message queue 18 (46).

Figure 6:
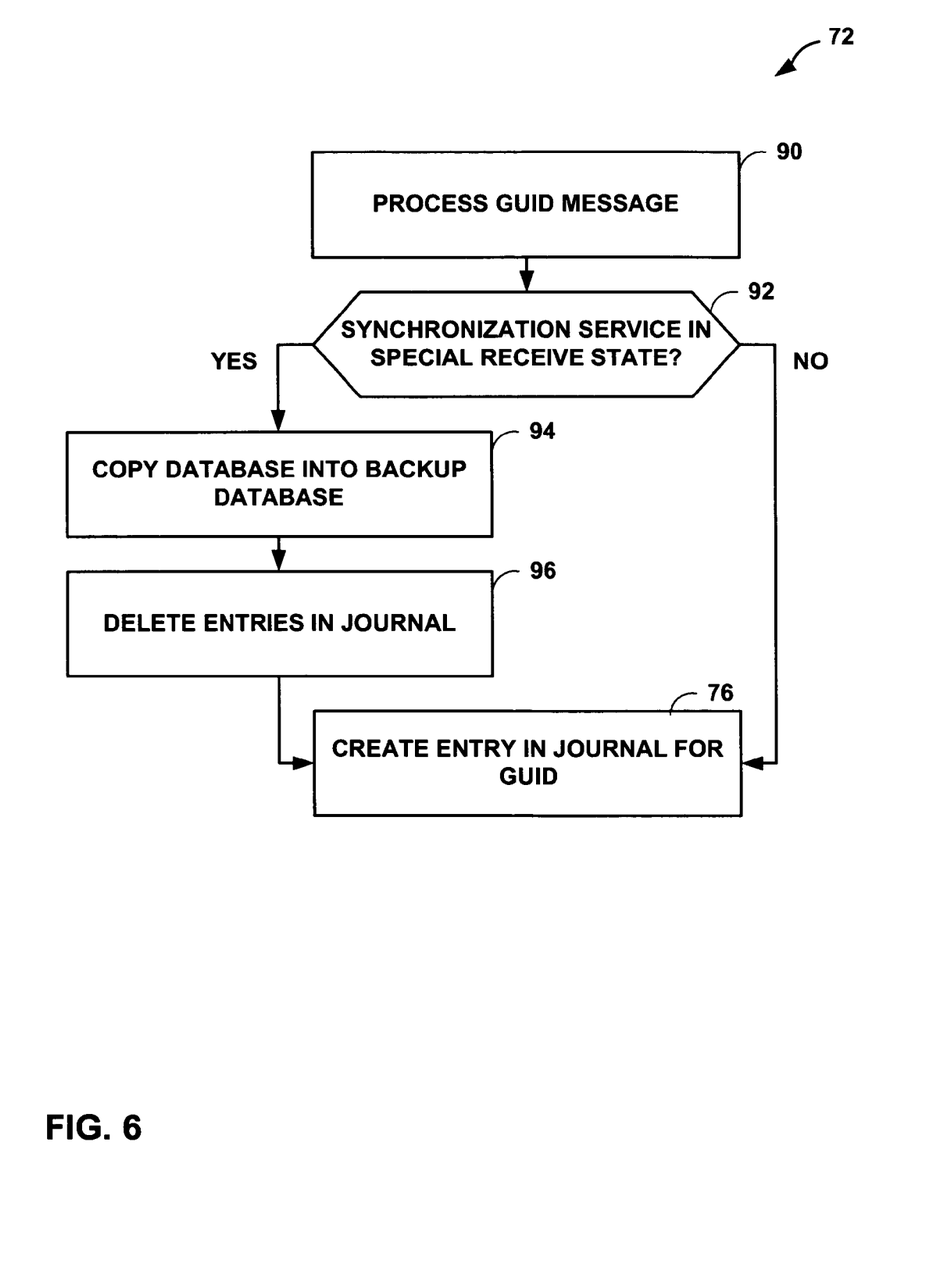
FIG. 6 is a flowchart illustrating an exemplary operation of a network device performing a journal rollover in accordance with an embodiment of the invention.

FIG. 6 is a flowchart illustrating an exemplary operation of a network device performing a journal rollover in accordance with an embodiment of the invention. The operation will be described herein in reference to network device 4A illustrated in FIG. 2. Initially, synchronization service 20 of network device 4A processes a GUID from one of network devices 4B-4D (90). If synchronization service module 20 is not in the special receive state (NO of 92), synchronization service module 20 creates an entry in journal 26 for the GUID (76).

On the other hand, if synchronization service module 20 is in the special receive state (YES of 92), then synchronization service module 20 copies the mutually shared data of database 6A into backup database 24 (94). Next, synchronization service module 20 deletes the change instruction and GUID entries recorded in journal 26 (66). After deleting the entries in journal 26, synchronization service module 20 records the processed GUID in journal 26 as the first entry (76). Synchronization service module 20 may then resume creating entries in journal 26 and applying change instructions to database 6A.

Figure 7:
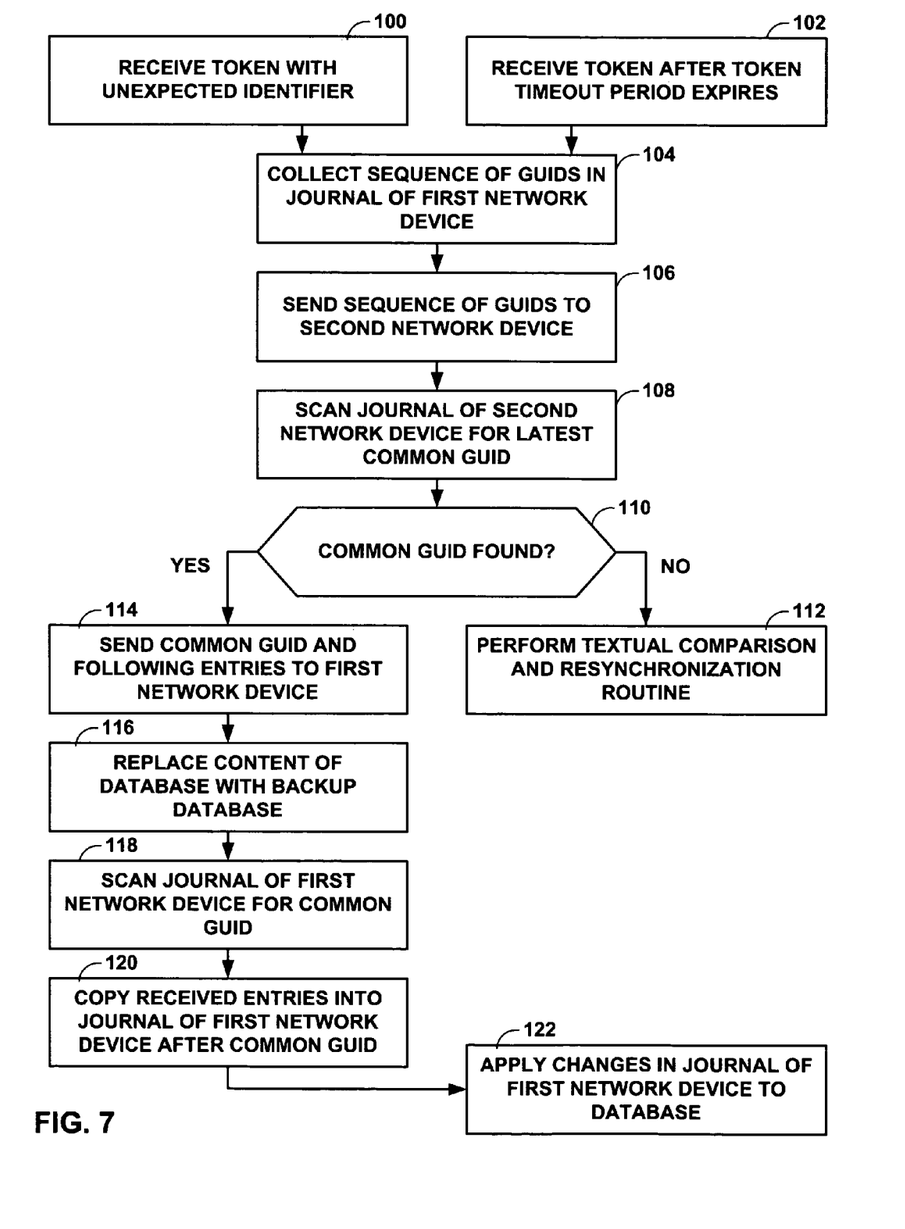
FIG. 7 is a flowchart illustrating an exemplary operation of network devices performing a resynchronization process in accordance with an embodiment of the invention.

FIG. 7 is a flowchart illustrating an exemplary operation of network devices performing a resynchronization process in accordance with an embodiment of the invention. The operation will be described herein in reference to network device 4A illustrated in FIG. 2. Synchronization service module 20 of network device 4A begins a resynchronization process when synchronization service module 20 receives a token that contains an unexpected identifier (100). Alternatively, synchronization service module 20 could begin the resynchronization process when synchronization service module 20 receives the token after a token timeout has expired (102). In either case, synchronization service module 20 determines that a failed connection between network device 4A and network 8 has been restored.

Synchronization service module 20 then collects a chronologically-ordered sequence of the GUIDs stored in journal 26 (104). Synchronization service module 20 then packages the sequence of GUIDs in a resynchronization request and sends the resynchronization request to a second network device, e.g., network device 4B (106).

When network device 4B receives the resynchronization request from synchronization service module 20 of network device 4A, network device 4B scans the journal of network device 4B for a latest common GUID (108). That is, network device 4B attempts to find the latest recorded GUID in the received resynchronization request from network device 4A that is also in the journal of network device 4B. If network device 4B cannot find the latest recorded GUID, network device 4B then scans the journal of network device 4B for the second to last GUID in the received sequence of GUIDs from network device 4A. This process continues until network device 4B finds a common GUID or exhausts the GUIDs included in the received sequence. If network device 4B cannot find a common GUID (110), network device 4B performs a textual comparison and resynchronization routine (112). On the other hand, if network device 4B finds a common GUID, network device 4B sends one or more resynchronization reply messages to synchronization service module 20 of network device 4A containing the common GUID and subsequent GUIDs and change instructions recorded in the journal of network device 4B in the order that network device 4B processed the GUIDs and change instructions (114).

Upon receipt of the resynchronization reply messages, synchronization service module 20 replaces the content of database 6A with the content of backup database 24 (116). Next, synchronization service module 20 scans journal 26 for the common GUID specified in the resynchronization reply messages (118). Synchronization service module 20 then copies the change instruction and GUID messages included in the resynchronization reply messages from network device 4B into journal 26 following the common GUID (120). Prior to copying the change instruction and GUID messages into journal 26, synchronization service module 20 may delete one or more existing change instruction or GUID messages recorded after the common GUID. After updating journal 26, synchronization service module 20 applies the change instruction messages in journal 26 to database 6A (122). At this point, synchronization service module 20 has resynchronized database 6A with database 6B of network device 4B.

Figure 8:
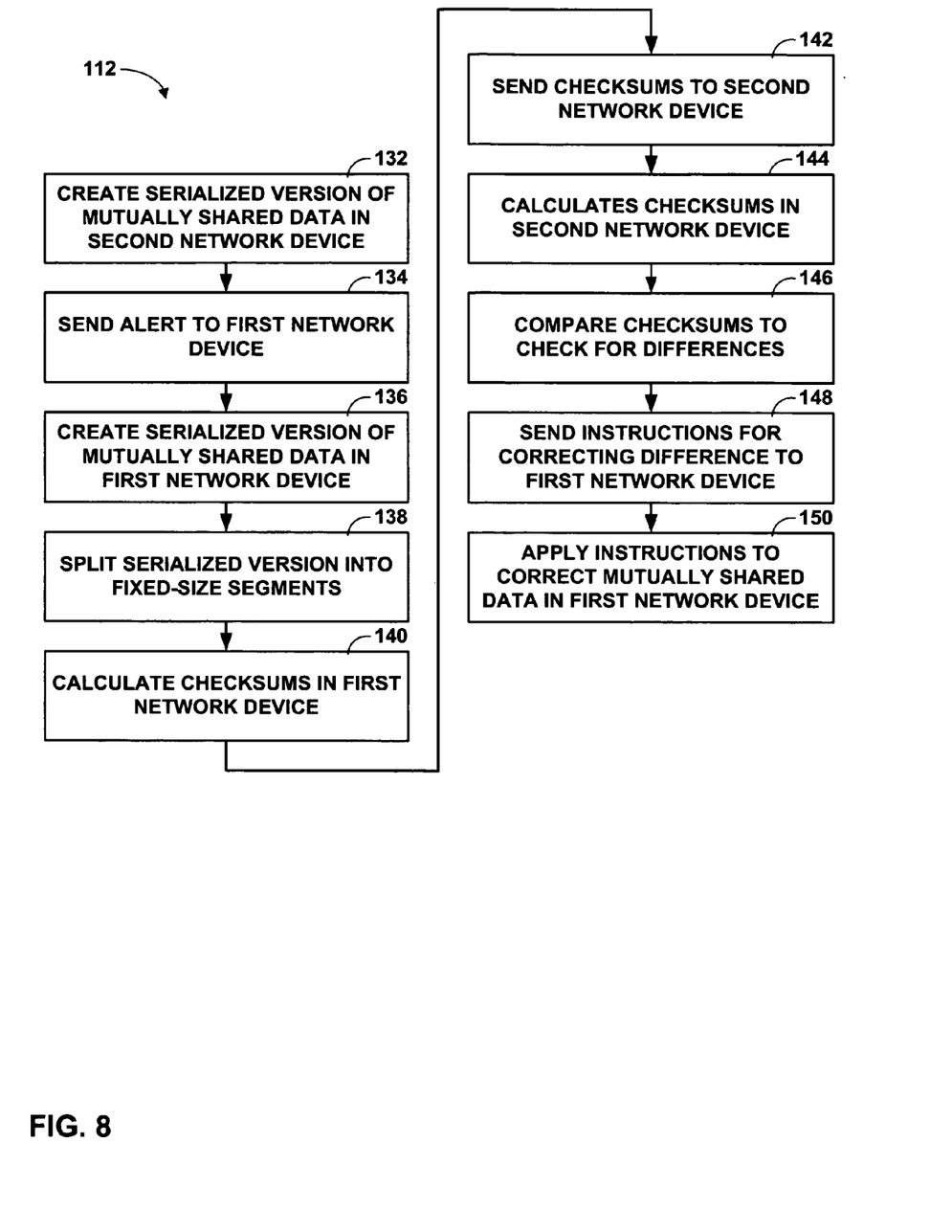
FIG. 8 is a flowchart illustrating an exemplary operation of network devices performing a textual comparison and resynchronization routine.

FIG. 8 is a flowchart illustrating an exemplary operation of network devices performing a textual comparison and resynchronization routine. The operation will be described herein in reference to network device 4A illustrated in FIG. 2. When network devices 4A and 4B cannot find a latest common GUID (step 110 from FIG. 5), the network devices perform a textual comparison and resynchronization routine (step 112 from FIG. 5) in order to resynchronize the mutually shared data of network device 4A. Network device 4B may be unable to find a common GUID between the respective journals of network devices 4A and 4B when network device 4A has been disconnected for a long time or either of the devices has recently rolled over their respective journals.

When network device 4B cannot find a common GUID, network device 4B creates a serialized version of the mutually shared data stored in database 6B (132). Network device 4B then sends an alert to network device 4A (134). When network device 4A receives an alert from network device 4B, network device 4A creates a serialized version of the mutually shared data stored in database 6A (136). Network device 4A then divides the serialized version of the mutually shared data into a series of segments of fixed size (138). For each segment, network device 4A calculates checksums (140). In particular, network device 4A computes a hash checksum and a rolling checksum. Network device 4A then sends these checksums to network device 4B (142).

Network device 4B then calculates a set of checksums based on the serialized version of the mutually shared data stored in database 6B. Network device 4B then compares the calculated checksums of network device 4B with the checksums received from network device 4A (144). If the checksums for a segment differ, then network device 4B knows that the copy of the segment stored by the network device 4A is different than the copy of the segment stored by the network device 4B. After locating any differences, network device 4B sends a set of instructions to network device 4A for correcting the mutually shared data stored in database 6A of network device 4A (146). Network device 4A then applies these instructions to correct the mutually shared data stored in database 6A such that network devices 4A and 4B have synchronized copies of the mutually shared data (148).

Various embodiments of the invention have been described. For example, a system has been described in which network devices, each of which stores mutually shared data in a database, communicate via a shared network to synchronize the mutually shared data. Nevertheless, various modifications may be made without departing from the spirit and scope of the invention. For example, each of the network devices may not store the mutually shared data in a database. In addition, the network devices may communicate using direct cable connections instead of via connections to a network. Furthermore, the agreed-ordering protocol used to transmit the change instruction or GUID messages between the network devices may not require the use of a token. These and other embodiments are within the scope of the following claims.

The invention claimed is:

1. A method of resynchronizing copies of mutually shared data stored by a network device and a second network device, the method comprising:
receiving a plurality of messages from the second network device coupled to the network device via a network using an agreed-order protocol that requires the network device and the second network device to exchange and process the messages in a defined order in accordance with a sequence number within each of the messages,
wherein the plurality of messages includes one or more messages containing change instructions to modify the mutually shared data and at least one message containing a unique identifier,
wherein each of the network device and the second network device maintain a respective journal, and
wherein the unique identifier received from the second device is a bookmark recorded in an entry in the journal of the second device and indicates that the second device has processed all change instructions that preceded the unique identifier in the journal of the second device to modify a copy of the mutually shared data stored on the second device;
recording the change instructions and the unique identifier in respective entries of the journal of the network device in chronological order in which the change instructions and the unique identifier were sent by the second network device;
storing the exchanged unique identifiers and change instructions in an inbound message queues of the network device;
receiving a token from the second network device;
determining, based at least in part on the token, whether an interruption has occurred in a connection between the network device and the network; and
responsive to determining that the interruption occurred, resynchronizing the mutually shared data of the network device by at least sending a resynchronization request to the second network device that includes a sequence of unique identifiers recorded in the journal of the network device.

2. The method of claim 1, further comprising:
applying the change instructions to the mutually shared data stored by the network device.

3. The method of claim 1, wherein resynchronizing the mutually shared data of the network device comprises:
sending a resynchronization request to the second network device that includes a sequence of unique identifiers recorded in the journal of the network device;
comparing the sequence of unique identifiers in the resynchronization request with unique identifiers recorded in the journal of the second network device to determine a common unique identifier; and
receiving a resynchronization reply from the second network device that includes a sequence of change instructions and unique identifiers recorded in the journal of the second network device starting with the common unique identifier.

4. The method of claim 3, further comprising:
storing the mutually shared data in a database within the network device;
periodically storing a backup of the mutually shared data in a backup database within the network device; and
deleting from the journal of the network device any of the change instructions and unique identifiers that were received prior to storing the backup.

5. The method of claim 4, wherein resynchronizing the mutually shared data of the network device comprises:
- finding the common unique identifier within the change instructions and unique identifiers recorded in the journal of the network device after storing the backup;
- replacing the mutually shared data stored in the database of the network device with the mutually shared data stored in the backup database;
- applying the change instructions recorded in the journal from the beginning of the journal to the common unique identifier; and
- applying the change instructions included in the resynchronization reply.

6. The method of claim 3, wherein sending a resynchronization request to the second network device comprises collecting a chronologically-ordered sequence of unique identifiers from the journal of the network device.

7. The method of claim 3, wherein receiving a resynchronization reply from the second network device comprises receiving a chronologically-ordered sequence of change instructions and unique identifiers recorded in the journal of the second network device starting with the common unique identifier.

8. The method of claim 3, wherein determining a common unique identifier comprises determining the latest recorded unique identifier in the resynchronization request from the network device that is also recorded in the journal of the second network device.

9. The method of claim 3, wherein resynchronizing the mutually shared data of the network device comprises performing a textual comparison and resynchronization routine when a common unique identifier cannot be found in the journal of the network device and the journal of the second network device.

10. The method of claim 9, wherein performing the textual comparison and resynchronization routine comprises comparing canonical representations of the mutually shared data stored in a database within the network device and a database within the second network device.

11. The method of claim 9, wherein performing the resynchronization routine comprises:
- receiving an alert from the second network device that a common unique identifier cannot be found;
- creating a serialized version of the mutually shared data stored in a database within the network device;
- dividing the serialized version of the mutually shared data stored in the database within the network device into a series of segments of fixed size;
- calculating checksums for each of the segments;
- sending the checksums to the second network device;
- comparing the checksums to checksums calculated from the mutually shared data stored in a database within the second network device; and
- receiving instructions from the second network device to correct the mutually shared data stored in the database of the network device.

12. The method of claim 1, further comprising:
- sending a unique identifier to the second network device when a size of the journal of the network device surpasses a predetermined threshold;
- storing a backup of the mutually shared data of the network device upon receiving a unique identifier;
- deleting the change instructions and unique identifier entries in the journal of the network device; and
- adding the received unique identifier to the journal of the network device.

13. The method of claim 1, wherein determining, based at least on the token, whether an interruption has occurred comprises receiving the token after a token timeout has expired.

14. The method of claim 1, wherein determining, based at least on the token, whether an interruption has occurred comprises receiving the token wherein the token contains an unexpected identifier.

15. The method of claim 1, wherein the network device and second network device comprise instant virtual extranet (IVE) devices.

16. The method of claim 1, wherein the unique identifier is a globally unique identifier.

17. A network device comprising:
- a programmable processor;
- a database to store data mutually shared between the network device and a second network device;
- an inbound message queue to store messages received from the second network device using an agreed-order protocol that requires the network device and the second network device to exchange and process the messages in a defined order in accordance with a sequence number within each of the messages, wherein the messages include one or more messages of a first type containing change instructions to modify the mutually shared data and one or more messages of a second type each containing a unique identifier, and wherein each of the unique identifiers received from the second device is a bookmark recorded in an entry of a journal of the second device and indicates that the second device has processed all change instructions that preceded the unique identifier in the journal of the second device;
- a non-transitory computer-readable medium to store a journal having a plurality of entries to record the change instructions and the unique identifiers in a chronological order in which the second network device sent the change instructions and the unique identifiers to the network device; and
- a synchronization service module operable by the programmable processor to receive a token from the second network device, determine, based at least in part on the token, whether an interruption has occurred in a connection between the network device and the network, and responsive to determining that the interruption occurred, and resynchronize the mutually shared data of the network device by sending a resynchronization request to the second network device that includes a sequence of the unique identifiers recorded in the journal of the network device.

18. The network device of claim 17, wherein the synchronization service module is further operable by the programmable processor to detect restored communication with the second network device.

19. The network device of claim 17, wherein the synchronization service module is further operable by the programmable processor to receive change instructions that describe a change in the mutually shared data, and apply the change instructions to the mutually shared data.

20. The network device of claim 17, wherein the synchronization service module is further operable by the programmable processor to receive a resynchronization request from the second network device that specifies a sequence of unique identifiers recorded in the journal of the second network device, compare the sequence of unique identifiers with unique identifiers recorded in the journal of the network device to determine a common unique identifier, and send a sequence of change instructions and unique identifiers in the journal following the common unique identifier to the second network device.

21. The network device of claim 17, wherein the synchronization service module is further operable by the programmable processor to send a resynchronization request to the second network device that includes a sequence of unique identifiers recorded in the journal, and receive a resynchronization reply from the second network device that includes a sequence of change instructions and unique identifiers that follow a last common unique identifier present in the journal and a journal of the second network device.

22. The network device of claim 20, further comprising:
   a backup database to store a backup of the mutually shared data,
   wherein the journal records unique identifiers and change instructions received by the network device after storing a backup of the mutually shared data in the backup database.

23. The network device of claim 22, wherein the synchronization service module is further operable by the programmable processor to record the resynchronization reply in the journal following the common unique identifier recorded in the journal, replace the mutually shared data stored in the database of the network device with the mutually shared data stored in the backup database, and apply the change instructions recorded in the journal to the mutually shared data stored in the database within the network device.

24. The network device of claim 23, wherein the synchronization service module is further operable by the programmable processor to delete entries in the journal following the common unique identifier prior to recording the resynchronization reply in the journal of the network device following the common unique identifier.

25. The network device of claim 21, wherein the resynchronization request comprises a chronologically-ordered sequence of unique identifiers from the journal.

26. The network device of claim 21, wherein the resynchronization reply comprises chronologically-ordered sequence of change instructions and unique identifiers recorded in the journal of the second network device starting with the common unique identifier.

27. The network device of claim 21, wherein the common unique identifier comprises the latest recorded unique identifier in the resynchronization request from the network device that is also recorded in the journal of the second network device.

28. The network device of claim 21, wherein the synchronization service module is further operable by the programmable processor to perform a textual comparison and resynchronization routine to resynchronize the mutually shared data of the network device when a common unique identifier cannot be found in the journal and the journal of the second network device.

29. The network device of claim 28, wherein the textual comparison and resynchronization routine comprises a comparison of canonical representations of the mutually shared data stored in the database and a database within the second network device.

30. The network device of claim 28, wherein the synchronization service module is further operable by the programmable processor to receive an alert from the second network device that a common unique identifier cannot be found, create a serialized version of the mutually shared data stored in the database, divide the serialized version of the mutually shared data stored in the database into a series of segments of fixed size, calculate checksums for each of the segments, send the checksums to the second network device, and receive instructions from the second network device to correct the mutually shared data stored in the database.

31. The network device of claim 28, wherein the synchronization service module is further operable by the programmable processor to send an alert to the second network device when a common unique identifier cannot be found, receive checksums from the second network device, compare the checksums to checksums calculated from the mutually shared data stored in the database, and send instructions to the second network device to correct the mutually shared data stored in a database of the second network device.

32. The network device of claim 17, wherein the synchronization service module is further operable by the programmable processor to send a unique identifier to the second network device when a number of entries in the journal surpasses a predetermined threshold, delete the change instructions and the unique identifiers recorded in the journal, and store a backup of the mutually shared data upon receiving a response unique identifier; and record the response unique identifier as a first entry in the journal.

33. The network device of claim 17, wherein the network device and the second network devices comprise instant virtual extranet (IVE) devices.

34. The network device of claim 17, wherein the unique identifier is a globally unique identifier.

35. A non-transitory computer-readable storage medium storing instructions for resynchronizing mutually shared data stored by a network device and a second network device, the instructions comprising instructions that cause a programmable processor to:
   receive a plurality of messages from a second network device coupled to the network device via a network using an agreed-order protocol that requires the network device and the second network device to exchange and process the messages in a defined order in accordance with a sequence number within each of the messages,
      wherein the plurality of messages includes one or more messages containing change instructions to modify the mutually shared data and at least one message of containing a unique identifier,
      wherein each of the network device and the second network device maintain a respective journal, and
      wherein the unique identifier received from the second device is a bookmark recorded in an entry in the journal of the second device and indicates that the second device has processed all change instructions that preceded the unique identifier in the journal of the second device to modify the shared data stored on the second device;
   record the change instructions and the unique identifier in respective entries of the journal of the network device in chronological order in which the change instructions and unique identifiers were sent by the second network device;
   store the exchanged unique identifiers and change instructions in an inbound message queue of the network device;
   receive a token from the second network device;
   determine, based at least in part on the token, whether an interruption has occurred in a connection between the network device and the network; and
   responsive to determining that the interruption occurred, resynchronize the mutually shared data of the network device by sending a resynchronization request to the second network device that includes a sequence of unique identifiers recorded in the network device.

36. The computer-readable medium of claim 35, further comprising instructions that cause the programmable processor to:
apply the change instructions to the mutually shared data.

37. The computer-readable medium of claim 35, wherein the instructions that cause the programmable processor to resynchronize the mutually shared data of the network device further cause the programmable process to:
send a resynchronization request to the second network device that includes a sequence of unique identifiers recorded in the journal of the network device;
compare the sequence of unique identifiers in the resynchronization request with unique identifiers recorded in a journal of the second network device to determine a common unique identifier; and
receive a resynchronization reply from the second network device that includes a sequence of change instructions and unique identifiers recorded in the journal of the second network device starting with the common unique identifier.

38. The computer-readable medium of claim 37, further comprising instructions that cause the programmable processor to:
store the mutually shared data in a database within the network device;
periodically store a backup of the mutually shared data in a backup database within the network device;
deleting from the journal of the network device the change instructions and unique identifiers that were received prior to storing the backup; and
record unique identifiers and change instructions received by the network device in the journal after storing the backup of the mutually shared data.

39. The computer-readable medium of claim 38, wherein the instructions that cause the programmable processor to resynchronize the mutually shared data of the network device further cause the programmable processor to:
record the resynchronization reply in the journal following the common unique identifier recorded in the journal;
replace the mutually shared data stored in the database of the network device with the mutually shared data stored in the backup database; and
apply the change instructions recorded in the journal to the mutually shared data stored in the database within the network device.

40. The computer-readable medium of claim 37, wherein the instructions that cause the programmable processor to resynchronize the mutually shared data of the network device further cause the programmable processor to perform a textual comparison and resynchronization routine when a common unique identifier cannot be found in the journal and the journal of the second network device.

41. The computer-readable medium of claim 37, wherein the instructions that cause the programmable processor to perform a resynchronization routine cause the programmable processor to:
receive an alert from the second network device that a common unique identifier cannot be found;
create a serialized version of the mutually shared data stored in a database within the network device;
divide the serialized version of the mutually shared data stored in the database into a series of segments of fixed size;
calculate checksums for each of the segments;
send the checksums to the second network device;
compare the checksums to checksums calculated from the mutually shared data stored in a database within the second network device; and
receive instructions from the second network device to correct the mutually shared data stored in the database of the network device.

42. The computer-readable medium of claim 35, further comprising instructions that cause the programmable processor to:
send a unique identifier to the second network device when a number of entries in the journal of the network device surpasses a predetermined threshold;
delete the change instructions and the unique identifiers recorded in the journal;
store a backup of the mutually shared data of the network device upon receiving a response unique identifier; and
record the response unique identifier as a first entry in the journal.

* * * * *